US012681887B2

(12) United States Patent
Shalom et al.

(10) Patent No.: US 12,681,887 B2
(45) Date of Patent: Jul. 14, 2026

(54) SECURED CROSS-ADDRESS-SPACE BRIDGING

(71) Applicant: Mellanox Technologies, Ltd., Yokneam (IL)

(72) Inventors: Gal Shalom, Givat-Avni (IL); Eliav Bar-Ilan, Or Akiva (IL); Daniil Provotorov, Tel-Aviv (IL); Ran Koren, Haifa (IL); Shay Aisman, Zichron Yaacov (IL); Amir Sharaffy, Ashkelon (IL); Jason Gunthorpe, Bedford (CA); Aviad Yehezkel, Yokneam Ilit (IL)

(73) Assignee: Mellanox Technologies, Ltd, Yokneam (IL)

( * ) Notice: Subject to any disclaimer, the term of this patent is extended or adjusted under 35 U.S.C. 154(b) by 60 days.

(21) Appl. No.: 18/973,137

(22) Filed: Dec. 9, 2024

(65) Prior Publication Data

US 2026/0161593 A1     Jun. 11, 2026

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
CPC ..................... G06F 13/4221; G06F 2213/0026
See application file for complete search history.

(56) References Cited

U.S. PATENT DOCUMENTS

| | | | |
|---|---|---|---|
| 5,822,749 | A | 10/1998 | Agarwal |
| 5,845,329 | A | 12/1998 | Onishi et al. |
| 5,864,876 | A | 1/1999 | Rossum et al. |
| 5,893,166 | A | 4/1999 | Frank et al. |

(Continued)

FOREIGN PATENT DOCUMENTS

| | | |
|---|---|---|
| CN | 102750242 A | 10/2012 |
| WO | 2018125490 A1 | 7/2018 |

OTHER PUBLICATIONS

European Examination Report, Application No. 22 159 730.5, dated Sep. 4, 2025.

(Continued)

*Primary Examiner* — Zachary K Huson
(74) *Attorney, Agent, or Firm* — Meitar Patents Ltd.; Daniel Kligler

(57) ABSTRACT
A network device includes a bus interface and one or more circuits. The bus interface communicates with a memory using a first bus domain, and with user applications using a second bus domain. The one or more circuits execute a first bus function that accesses a region of the memory using a memory-domain MKEY in the first bus domain, execute a second bus function that communicates with the user applications using the second bus domain, and communicates packets over the network for the user applications, wherein processing of the packets includes accessing the region of the memory via a cross-bus-domain MKEY that points to the memory-domain MKEY in the first bus function, and, in response to authorizing access to a sub-region in the region of the memory, defines for the sub-region a cross-security-domain MKEY pointing to the cross-bus-domain MKEY, which in turn points to the memory-domain MKEY.

20 Claims, 5 Drawing Sheets

(56) References Cited

U.S. PATENT DOCUMENTS

| | | | |
|---|---|---|---|
| 6,070,219 | A | 5/2000 | McAlpine et al. |
| 6,321,276 | B1 | 11/2001 | Forin |
| 6,629,166 | B1 | 9/2003 | Grun |
| 6,766,467 | B1 | 7/2004 | Neal et al. |
| 6,789,143 | B2 | 9/2004 | Craddock et al. |
| 6,981,027 | B1 | 12/2005 | Gallo et al. |
| 7,171,484 | B1 | 1/2007 | Krause et al. |
| 7,245,627 | B2 | 7/2007 | Goldenberg et al. |
| 7,263,103 | B2 | 8/2007 | Kagan et al. |
| 7,299,266 | B2 | 11/2007 | Boyd et al. |
| 7,464,198 | B2 | 12/2008 | Martinez et al. |
| 7,475,398 | B2 | 1/2009 | Nunoe |
| 7,548,999 | B2 | 6/2009 | Haertel et al. |
| 7,752,417 | B2 | 7/2010 | Manczak et al. |
| 7,809,923 | B2 | 10/2010 | Hummel et al. |
| 7,921,178 | B2 | 4/2011 | Haviv |
| 8,001,592 | B2 | 8/2011 | Hatakeyama |
| 8,010,763 | B2 | 8/2011 | Armstrong et al. |
| 8,051,212 | B2 | 11/2011 | Kagan et al. |
| 8,086,765 | B2 | 12/2011 | Turner et al. |
| 8,255,475 | B2 | 8/2012 | Kagan et al. |
| 8,429,675 | B1 | 4/2013 | Radhakrishnan et al. |
| 8,447,904 | B2 | 5/2013 | Riddoch |
| 8,645,663 | B2 | 2/2014 | Kagan et al. |
| 8,745,276 | B2 | 6/2014 | Bloch et al. |
| 8,914,458 | B2 | 12/2014 | Raindel et al. |
| 9,256,545 | B2 | 2/2016 | Raindel et al. |
| 9,298,642 | B2 | 3/2016 | Kagan et al. |
| 9,639,464 | B2 | 5/2017 | Eran et al. |
| 9,696,942 | B2 | 7/2017 | Kagan et al. |
| 11,940,933 | B2 | 3/2024 | Burstein et al. |
| 2002/0152327 | A1 | 10/2002 | Kagan et al. |
| 2003/0046530 | A1 | 3/2003 | Poznanovic |
| 2004/0221128 | A1 | 11/2004 | Beecroft et al. |
| 2004/0230979 | A1 | 11/2004 | Beecroft et al. |
| 2005/0097183 | A1 | 5/2005 | Westrelin |
| 2006/0190689 | A1 | 8/2006 | Van Niekerk |
| 2007/0011429 | A1 | 1/2007 | Sangili et al. |
| 2007/0061492 | A1 | 3/2007 | van Riel |
| 2007/0226450 | A1 | 9/2007 | Engbersen et al. |
| 2007/0283124 | A1 | 12/2007 | Menczak et al. |
| 2008/0098198 | A1 | 4/2008 | Kawamura et al. |
| 2009/0019256 | A1 | 1/2009 | Kneebone et al. |
| 2010/0030975 | A1 | 2/2010 | Murray et al. |
| 2010/0077397 | A1 | 3/2010 | Ooi et al. |
| 2010/0095085 | A1 | 4/2010 | Hummel et al. |
| 2010/0217916 | A1 | 8/2010 | Gao et al. |
| 2010/0274876 | A1 | 10/2010 | Kagan et al. |
| 2010/0332789 | A1 | 12/2010 | Sugumar et al. |
| 2011/0023027 | A1 | 1/2011 | Kegel et al. |
| 2011/0307646 | A1 | 12/2011 | Lee et al. |
| 2013/0110959 | A1 | 5/2013 | Sharp et al. |
| 2013/0145085 | A1 | 6/2013 | Yu et al. |
| 2014/0122828 | A1 | 5/2014 | Kagan et al. |
| 2014/0185616 | A1 | 7/2014 | Bloch et al. |
| 2014/0201421 | A1 | 7/2014 | Schoenberg |
| 2015/0067211 | A1 | 3/2015 | Inooka et al. |
| 2015/0261434 | A1 | 9/2015 | Kagan et al. |
| 2016/0294983 | A1 | 10/2016 | Kliteynik et al. |
| 2017/0054659 | A1 | 2/2017 | Ergin et al. |
| 2017/0272400 | A1 | 9/2017 | Bansal et al. |
| 2018/0300117 | A1 | 10/2018 | Ackerman |
| 2019/0005606 | A1 | 1/2019 | Yang |
| 2019/0391927 | A1 | 12/2019 | Tsirkin |
| 2020/0285498 | A1 | 9/2020 | Keeth et al. |
| 2020/0319913 | A1 | 10/2020 | Kumar et al. |
| 2022/0197505 | A1 | 6/2022 | Kannan et al. |
| 2022/0365898 | A1* | 11/2022 | Guo ..................... G06F 13/382 |
| 2024/0061792 | A1* | 2/2024 | Confalonieri ....... G06F 12/1408 |
| 2024/0086554 | A1* | 3/2024 | Daughety ............ G06F 21/604 |
| 2025/0103526 | A1* | 3/2025 | Shelley ................. G06F 13/20 |
| 2025/0139305 | A1* | 5/2025 | Sahita .................... G06F 21/85 |

OTHER PUBLICATIONS

"Linux kernel enable the IOMMU—input/output memory management unit support", http://www.cyberciti.biz/tips/howto-turn-on-linux-software-iommu-support.html, pp. 1-5, Oct. 15, 2007.

Solomon R., "IOV 1.1 Update and Overview", LSI Corporation, Member I/O Virtualization Workgroup, PCI-SIG, PCI Express, pp. 1-45, 2010.

Hummel M., "IO Memory Management Hardware Goes Mainstream", AMD Fellow, Computation Products Group, Microsoft WinHEC, pp. 1-7, 2006.

"MPI: A Message-Passing Interface Standard", Version 2.2, Message Passing Interface Forum, pp. 1-647, Sep. 4, 2009.

Infiniband Trade Association, "InfiniBandTM Architecture Specification", vol. 1, Release 1.2.1, pp. 1-1727, Nov. 2007.

Shah et al., "Direct Data Placement over Reliable Transports", IETF Network Working Group, RFC 5041, pp. 1-38, Oct. 2007.

Culley et al., "Marker PDU Aligned Framing for TCP Specification", IETF Network Working Group, RFC 5044, pp. 1-75, Oct. 2007.

Welsh et al., "Incorporating Memory Management into User-Level Network Interfaces", Department of Computer Science, Cornell University, Technical Report TR97—1620, pp. 1-10, Feb. 13, 1997.

Shenoy, "Paging and Virtual Memory", CMPSCI 377 Operating Systems, Lecture 14, pp. 1-3, Mar. 9, 2009.

EP Application # 22159730.5 Search Report dated Jul. 28, 2022.

CN Application # 202210145282.9 Office Action dated Feb. 7, 2024.

CN Office Action, Application No., 202210145282.9 dated May 3, 2025.

* cited by examiner

SECURED CROSS-ADDRESS-SPACE BRIDGING

TECHNICAL FIELD

The present disclosure relates generally to network communication, and particularly to cross-address-space bridging in network devices.

BACKGROUND

Network devices, such as Network Interface Controllers (NICs), Host Channel Adapters (HCAs) and Data Processing Units (DPUs) are commonly used for providing network services to user applications. In an example configuration, the user applications run on a suitable processor, and the network device communicates with the processor over a peripheral bus. Examples of peripheral buses include Peripheral Component Interconnect express (PCIe), Nvlink and Compute Express Link (CXL).

SUMMARY

An embodiment that is described herein provides a network device including one or more ports, a bus interface and one or more circuits. The one or more ports are to connect to a network. The bus interface is to (i) communicate with a memory using a first bus domain of a peripheral bus, and (i) communicate with one or more user applications using a second bus domain of the peripheral bus. The one or more circuits are to execute a first bus function that accesses a region of the memory using a memory-domain memory key (MKEY) defined in the first bus domain, to execute a second bus function that communicates with the user applications using the second bus domain, and communicates packets over the network for the user applications, wherein processing of the packets includes accessing the region of the memory via a cross-bus-domain MKEY that points to the memory-domain MKEY in the first bus function, and, in response to authorizing a user application to access a sub-region in the region of the memory, to define for the sub-region a respective cross-security-domain MKEY that points to the cross-bus-domain MKEY, which in turn points to the memory-domain MKEY.

In some embodiments, in response to authorizing one or more of the user applications to access one or more additional sub-regions in the region of the memory, the one or more circuits are to define one or more additional cross-security-domain MKEYs for the one or more additional sub-regions, the one or more additional cross-security-domain MKEYs pointing to the cross-bus-domain MKEY.

In a disclosed embodiment, the first bus function is to receive the cross-security-domain MKEY from a policer that authorizes requests from the user applications to access sub-regions in the region of the memory and defines respective cross-security-domain MKEYs for the sub-regions.

In an example embodiment, in response to a memory-access command from the user application that specifies a virtual address (VA), the one or more circuits are to translate the VA into a physical address (PA) in the sub-region, in accordance with an address mapping defined in the memory-domain MKEY, and to access the PA in the memory.

In an embodiment, the first bus function is to communicate with a Graphics Processing Unit (GPU), the memory is internal to the GPU, the second bus function is to communicate with one or more hosts, and the user applications run on the one or more hosts. In another embodiment, the network device is a Data Processing Unit (DPU) including a CPU and one or more processor cores, the first bus function is to communicate with the CPU, the memory is internal to the CPU, the second bus function is to communicate with the one or more processor cores, and the user applications run on the one or more processor cores.

In an example embodiment, the cross-security-domain MKEY includes a first MKEY that modifies a Protection Domain (PD) of the sub-region, and a second MKEY that maps addresses of the sub-region.

There is additionally provided, in accordance with an embodiment that is described herein, a method in a network device. The method includes communicating, by the network device, with a memory using a first bus domain of a peripheral bus, and with one or more user applications using a second bus domain of the peripheral bus. A first bus function is executed in the network device, the first bus function accessing a region of the memory using a memory-domain memory key (MKEY) defined in the first bus domain. A second bus function is executed in the network device, the second bus function communicating with the user applications using the second bus domain, and communicates packets over the network for the user applications, wherein processing of the packets includes accessing the region of the memory via a cross-bus-domain MKEY that points to the memory-domain MKEY in the first bus function. In response to authorizing a user application to access a sub-region in the region of the memory, a respective cross-security-domain MKEY is defined for the sub-region. The cross-security-domain MKEY points to the cross-bus-domain MKEY, which in turn points to the memory-domain MKEY.

There is further provided, in accordance with an embodiment that is described herein, a data center including one or more network devices. At least a network device among the network devices includes one or more ports, a bus interface and one or more circuits. The one or more ports are to connect to a network. The bus interface is to (i) communicate with a memory using a first bus domain of a peripheral bus, and (i) communicate with one or more user applications using a second bus domain of the peripheral bus. The one or more circuits are to execute a first bus function that accesses a region of the memory using a memory-domain memory key (MKEY) defined in the first bus domain, to execute a second bus function that communicates with the user applications using the second bus domain, and communicates packets over the network for the user applications, wherein processing of the packets includes accessing the region of the memory via a cross-bus-domain MKEY that points to the memory-domain MKEY in the first bus function, and, in response to authorizing a user application to access a sub-region in the region of the memory, to define for the sub-region a respective cross-security-domain MKEY that points to the cross-bus-domain MKEY, which in turn points to the memory-domain MKEY.

The present disclosure will be more fully understood from the following detailed description of the embodiments thereof, taken together with the drawings in which:

DETAILED DESCRIPTION OF EMBODIMENTS

Overview

Figure 1:
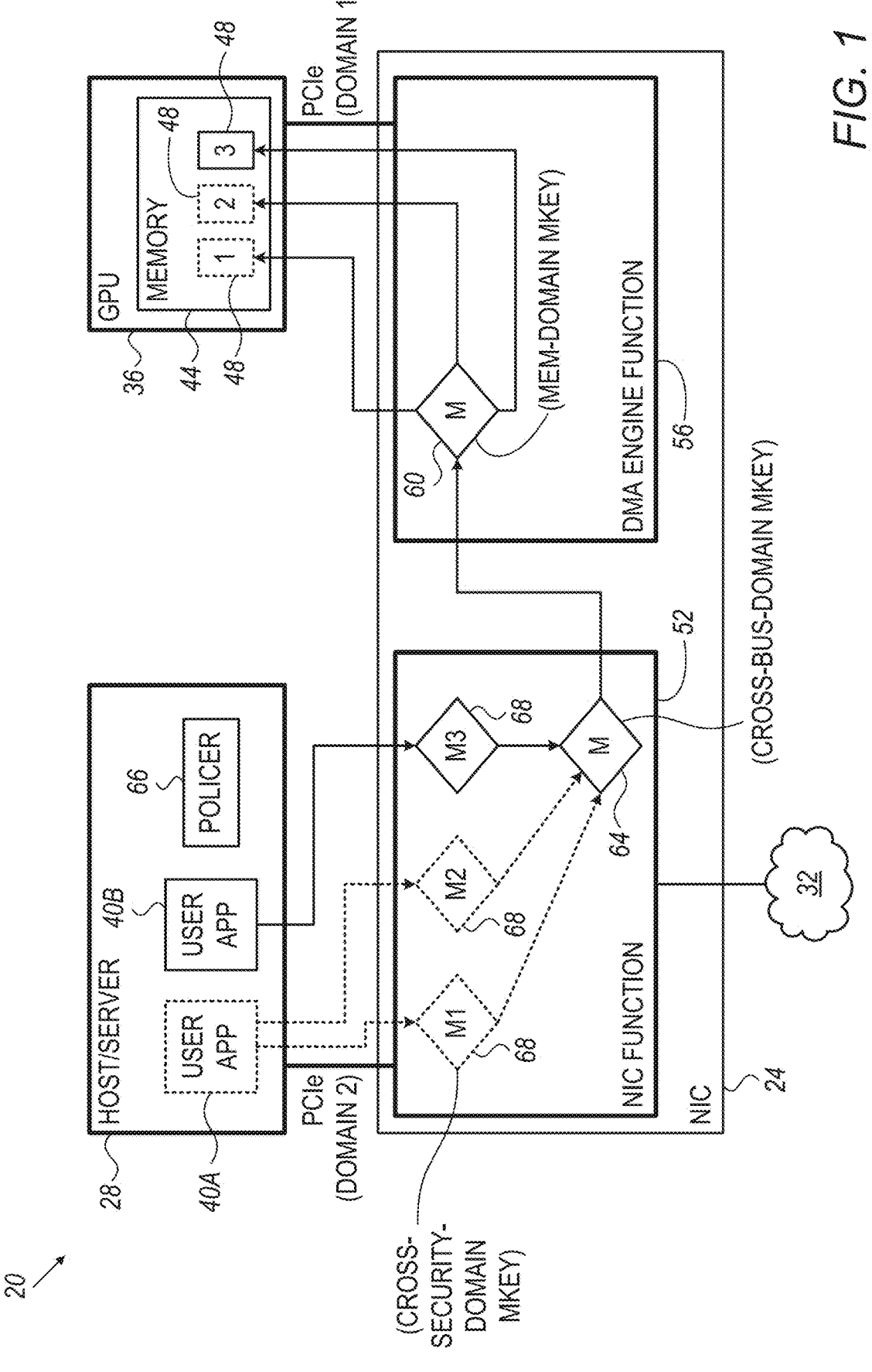
FIGS. 1 and 2 are block diagrams that schematically illustrate computing and communication systems that use small-overhead secured cross-address-space bridging, in accordance with embodiments that are described herein.

Embodiments that are described herein provide improved network devices (e.g., NICs, HCAs or DPUs) and associated methods. In disclosed embodiments, a network device transmits and receives packets to and from a network, to provide network communication to user applications that run on a processor. In the embodiments described herein, the network device communicates over the network using the Remote Direct Memory Access (RDMA) protocol. Alternatively, any other suitable protocol can be used.

The network device connects to the processor using one domain of a peripheral bus, and with a memory over a separate domain of the peripheral bus. The memory is used for storing relevant information, e.g., packet data. The network device executes two bus functions: A first bus function that communicates with the memory over a first domain of the peripheral bus, and a second bus function that communicates with the processor over a second domain of the peripheral bus. The two bus functions may be implemented in hardware and/or firmware.

The embodiments described herein refer mainly to the PCIe bus, by way of example. The terms "peripheral bus", "bus" and "PCIe bus" are used interchangeably herein, as are the terms "bus domain" and "PCIe domain", and "bus function" and "PCIe function". In alternative embodiments, the disclosed techniques can be used in a similar manner with any other suitable peripheral bus, e.g., Compute Express Link (CXL).

The first PCIe function in the network device is responsible for accessing the memory. The second PCIe function in the network device is responsible for communicating with the user applications, and for sending and receiving packets over the network.

To transmit a packet, the first PCIe function needs to read the packet data from the memory. The packet data then needs to be delivered to the second PCIe function for generating the packet. When receiving a packet, the second PCIe function needs to deliver the packet data to the first PCIe function for storage in the memory. Exchanging data between the first and second PCIe functions is non-trivial, because the two PCIe functions address the data in question using two different address spaces.

The first PCIe function typically accesses the packet data in the memory using a certain Memory Key (MKEY) that specifies a translation between Virtual Addresses (VAs) and corresponding Physical Addresses (PAs) in the memory. A user application, on the other hand, specifies the addresses of the data in terms of a different MKEY. Exchanging data between the first and second PCIe functions calls for bridging between different address spaces defined in the two different PCIe domains. Certain aspects of cross-addressspace bridging are addressed in U.S. Pat. No. 11,940,933, whose disclosure is incorporated herein by reference.

In one possible solution, the network supports a mechanism that permits one PCIe function in one PCIe domain to access the address space of another PCIe function in a different PCIe domain. In this solution, the network device defines a "cross-domain MKEY" for each request by a user application to send or receive data between the network and the memory. The cross-domain MKEY translates VAs in the address space used by the user application (and by the second PCIe function) into corresponding VAs in the address space used by the first PCIe function.

In many practical cases, however, the above-described solution can be suboptimal. Consider, for example, a scenario in which the network device needs to transmit and/or receive a large number of data buffers corresponding to a large number of sub-regions of the memory. When using the above-described solution, the network device defines a separate cross-domain MKEY for every sub-region of the memory, i.e., for every data buffer to be transmitted or received. Such a solution incurs considerable processing overhead and memory space, and does not scale well. The processing overhead is especially large when each cross-domain MKEY has to be checked against a security policy before it is deployed.

In embodiments that are described herein, the network device provides a highly scalable and secure cross-address-space mechanism, which does not require a separate cross-domain MKEY per data buffer (i.e., per memory sub-region being accessed). Instead, the network device defines two MKEYs that are generic, i.e., not specific to any particular user application, buffer or memory sub-region:

- A "memory-domain MKEY": An MKEY that is defined in the first PCIe domain and used by the first PCIe function. This MKEY translates the entire virtual address space of the first PCIe domain into respective physical addresses in the memory.
- A "cross-PCIe-domain MKEY" (or "cross-bus-domain MKEY"): An MKEY that is defined in the second PCIe domain and used by the second PCIe function. This MKEY translates the entire virtual address space of the second PCIe domain into the virtual address space of the first PCIe domain.

Applying the cross-PCIe-domain MKEY to a VA in the address space of the second PCIe domain yields a corresponding VA in the address space of the first PCIe domain. Applying the memory-domain MKEY to this result (to a VA in the address space of the first PCIe domain) yields the corresponding PA in the memory. These translations can be performed for any sub-region of the memory.

In order to access a specific sub-region that stores a specific data buffer, the network device defines a specific MKEY, referred to as a "cross-security-domain MKEY". The cross-security-domain MKEY is defined in the second PCIe domain, and points to the cross-PCIe-domain MKEY (also in the second PCIe domain). The cross-security-domain MKEY maps the VAs of the specific data buffer (memory sub-region), not the entire address space of the second PCIe domain.

As its name suggests, in some embodiments the cross-security-domain MKEY is also used to enforce security policies. In some embodiments, the system (e.g., the host) runs a policer that approves or denies requests from user applications to transmit and receive data buffers. When the policer approves a certain request, it defines the corresponding cross-security-domain MKEY.

Thus, when requested to transmit and/or receive multiple data buffers corresponding to multiple memory sub-regions, the policer and network device only need to set-up a respective cross-security-domain MKEY for each sub-region. The multiple cross-security-domain MKEYs all point to the cross-PCIe-domain MKEY, which in turn points to the memory-domain MKEY. The cross-security-domain MKEY typically does not perform any address translation, and is therefore relatively small and simple. Defining a cross-security-domain MKEY for a sub-region is an operation that incurs very modest overhead in terms of memory and computational power. The disclosed cross-address-space bridging mechanism is thus highly efficient, scalable and secure.

System Description

FIG. 1 is a block diagram that schematically illustrates a computing and communication system 20 that uses small-overhead secured cross-address-space bridging, in accordance with an embodiment that is described herein. System 20 comprises a network device, in the present example a NIC 24, which connects a host 28 (also referred to as a server or a processor) to a network 32. System 20 further comprises a Graphics Processing Unit (GPU) 36 connected to NIC 24.

System 20 may serve, for example, as a node in a data center. A node of this sort may comprise multiple NICs, multiple hosts and/or multiple GPUs. The present example shows a single NIC, a single host and a single GPU for the sake of clarity. A more complex system use-case can be seen in FIG. 6 below.

NIC 24 comprises one or more ports for connecting to network 32, and a bus interface for connecting to host 28. The port(s) and bus interface are omitted from the figure for the sake of clarity. GPU 36 comprises a memory 44, e.g., a Random Access Memory (RAM). NIC 24 is connected to GPU 36 via the NIC's bus interface.

In the embodiment of FIG. 1, NIC 24 communicates with host 28 and with GPU 36 using PCIe. NIC 24 communicates with GPU 36 using one PCIe domain, referred to herein as "domain 1", and with host 28 using a separate PCIe domain, referred to herein as "domain 2". In alternative embodiments, any other suitable peripheral bus can be used.

Host 28 runs one or more user applications 40, in the present example two applications denoted 40A and 40B. User applications 40 send and receive packets over network 32 using NIC 24. In some embodiments, NIC 24 sends and receives packets to and from peer NICs using RDMA. In this implementation, packet data (e.g., data to be transmitted in outgoing packets and/or data that was received in incoming packets) is stored in a suitable region of memory 44 of GPU 36.

To send an outgoing packet to a remote NIC, NIC 24 reads a corresponding memory buffer directly from memory 44, without involving host 28, generates a packet that carries the data, and sends the packet over network 32. Similarly, on receiving a packet, NIC 24 writes the packet data directly to a memory buffer in memory 44 without involving host 28.

In the example of FIG. 1, memory buffers for user applications 40A and 40B are stored in three memory sub-regions 48 in memory 44 of GPU 36. The terms "memory buffers", and "memory sub-regions" are used interchangeably herein. User application 40A handles two separate communication connections over network 32. Packet data for the two connections is stored in two respective memory sub-regions 48 denoted "1" and "2". User application 40B handles one communication connection over the network. Packet data for this connection is stored in a memory sub-region 48 denoted "3".

NIC 24 executes two PCIe functions, typically implemented in hardware: A DMA engine function 56 is associated with PCIe domain 1 and is responsible for accessing GPU memory 36. A NIC function 52 is associated with PCIe domain 2 and is responsible for communicating with host 28 and for sending and receiving packets over network 32. Thus, in some embodiments NIC 24 comprises (i) one or more ports for communicating with network 32, (ii) a bus interface for communicating with host 28 (e.g., with user applications 40) and with GPU 36 (e.g., with memory 44), and (iii) one or more circuits, comprising at least PCIe functions 52 and 56.

As noted above, both the packet transmission process and the packet reception process involve transferring data between memory region 48 and network 32. As such, both packet transmission and packet reception call for bridging between the address spaces of PCIe domain 1 and PCIe domain 2.

In some embodiments, NIC 24 transmits and receives packet by applying a chain of three types of memory keys (MKEYs). This solution provides cross-address-space bridging with a high level of scalability, high security and small management overhead.

The first type of MKEY is referred to as a "memory-domain MKEY" 60. Memory-domain MKEY 60 is defined in PCIe domain 1, and is used by DMA engine function 56. Memory-domain MKEY 60 translates the entire virtual address space of the PCIe domain 1 into respective physical addresses in memory 44. Memory-domain MKEY 60 is generic, in the sense that it is not specific to any user application 40 or memory sub-region 48.

The second type of MKEY is referred to as a "cross-PCIe-domain MKEY" 64 (or "cross-bus-domain MKEY"). Cross-PCIe-domain MKEY 64 is defined in the PCIe domain 2 and is used by NIC function 52. Cross-PCIe-domain MKEY 64 translates the entire virtual address space of PCIe domain 2 into the virtual address space of PCIe domain 1. Cross-PCIe-domain MKEY 64 is also generic, i.e., not specific to any user application 40 or memory sub-region 48. MKEY 64 points to MKEY 60.

The third type of MKEY is referred to as a "cross-security-domain MKEY" 68. This type of MKEY is not generic. Rather, a respective instance of cross-security-domain MKEY 68 is defined in order to access a specific memory sub-region 48. In the example of FIG. 1, three cross-security-domain MKEYs 68, denoted M1, M2 and M3, are defined for accessing the three memory sub-regions 48 denoted "1", "2" and "3", respectively. M1 and M2 are defined for user application 40A, and M3 is defined for user application 40B. Cross-security-domain MKEYs 68 are defined in PCIe domain 2, and all point to cross-PCIe-domain MKEY 64. A given cross-security-domain MKEY 68 maps the VAs of the specific data buffer (memory sub-region 48).

A given cross-security-domain MKEY 68 can be viewed as having a dual functionality—(i) modifying the Protection Domain (PD) of sub-region 48, and (ii) mapping the addresses of the sub-region. An alternative implementation, in which MKEY 68 is replaced by two MKEYs that perform these two functions separately, is described below with reference to FIG. 4.

In some embodiments, system 20 further comprises a policer 66 that is responsible for enforcing security policies. Policer 66, possibly among other tasks, authorizes requests from user applications 40 to access sub-regions 48 in memory 44. Upon authorizing a request, policer 66 defines a corresponding cross-security-domain MKEY 68 and provides the MKEY 68 to the requesting user application. Since this MKEY 68 maps only the addresses of the specific sub-region 48, the user application cannot access other sub-regions 48. This mechanism enables policer 66 to ensure that the applicable security policies are not violated. In the preset example, policer 66 is implemented as a software module that runs (with high privileges) on host 28. Alternatively, policer 66 may run on any other suitable system element, e.g., in the firmware of NIC 24.

Figure 2:
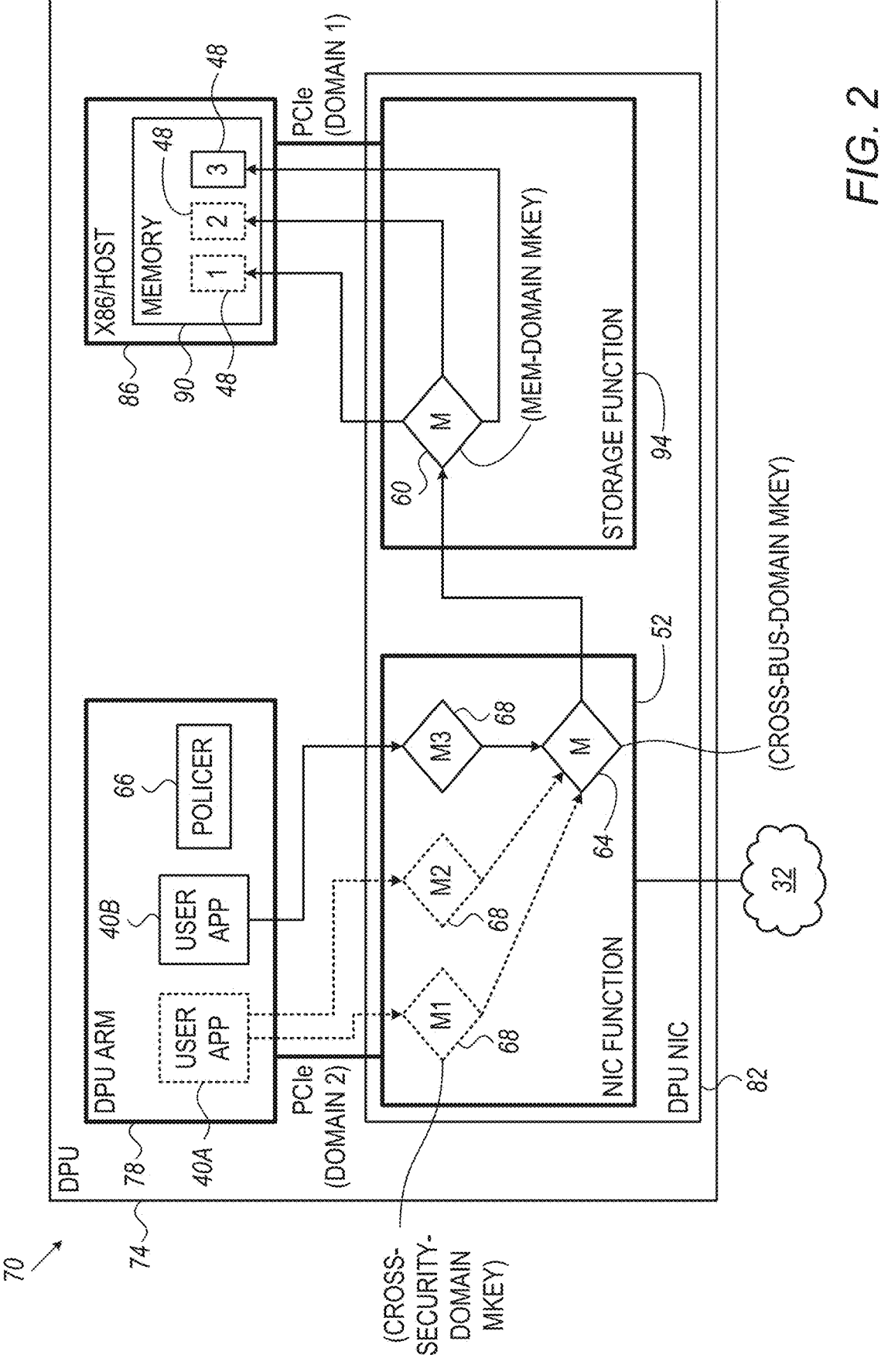

FIG. 2 is a block diagram that schematically illustrates a computing and communication system 70 that uses small-overhead secured cross-address-space bridging, in accordance with another embodiment that is described herein. This embodiment differs from that of FIG. 1 in that the user applications, NIC and memory are all integrated in a Data Processing Unit (DPU) 74, sometimes referred to as a "Smart NIC". System 70, too, may serve, for example, as a node in a data center. A node of this sort may comprise one or more DPUs 74.

DPU 74 comprises one or more processor cores, in the present example ARM cores 78, which run user applications 40, in the present example user applications 40A and 40B. DPU 74 further comprises one or more Central Processing Units (CPUs), in the present example an x86 CPU 86 also referred to as a host. CPU 86 comprises a memory 90, e.g., a RAM, a region of which stores sub-regions 48.

DPU 74 further comprises a NIC 82. Similarly to NIC 24 of FIG. 1, NIC 82 comprises one or more ports (not seen in the figure) for communicating with network 32, and a bus interface (also not seen in the figure) for communicating with ARM cores 78 and CPU 86. NIC 82 further comprises one or more circuits comprising at least a NIC function 52 and a storage function 94.

Storage function 94 is associated with PCIe domain 1, and is responsible for accessing memory 90. NIC function 52 is associated with PCIe domain 2, and is responsible for communicating with user applications 40 and for communicating over network 32 (similarly to NIC function 52 of FIG. 1).

In the present example, ARM cores 78 also run policer 66. Alternatively, policer 66 may run, for example, in the firmware of DPU NIC 82. The cross-address-space-bridging scheme in DPU 74 is similar to that of FIG. 1—Using memory-domain MKEY 60, cross-PCIe-domain MKEY 64 and one or more cross-security-domain MKEYs 68.

The configurations of systems 20 and 70, including the configurations of NICs 24 and 82, host 28, DPU 74, and other system components, as illustrated in FIGS. 1 and 2, are example configurations chosen purely for the sake of conceptual clarity. In alternative embodiments, any other suitable configuration can be used.

The disclosed network devices, e.g., NIC 24 and DPU 74, may be implemented using suitable hardware, such as in one or more Application-Specific Integrated Circuits (ASICs) or Field-Programmable Gate Arrays (FPGAs), using software, using hardware, or using a combination of hardware and software elements. Memories 44 and 90 may be implemented in any suitable memory, e.g., Random Access Memory (RAN). Elements that are not mandatory for understanding of the disclosed techniques have been omitted from the figure for the sake of clarity.

Certain elements of the disclosed network devices may be implemented using one or more general-purpose processors, which are programmed in software to carry out the functions described herein. The software may be downloaded to the processor or processors in electronic form, over a network, for example, or it may, alternatively or additionally, be provided and/or stored on non-transitory tangible media, such as magnetic, optical, or electronic memory.

Chained MKEYs Used in Cross-Address-Space Bridging

Figure 3:
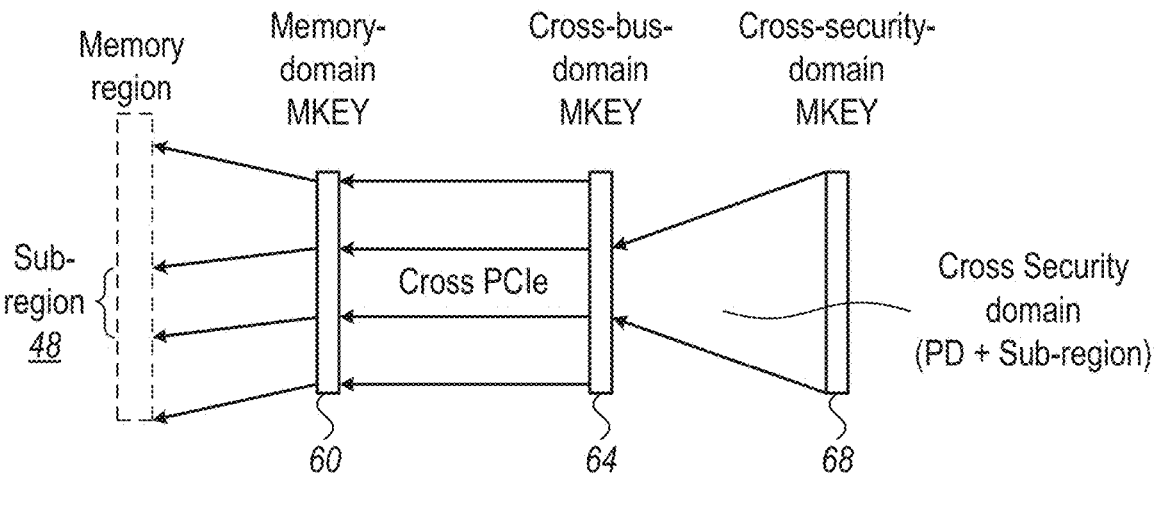
FIGS. 3 and 4 are diagrams that schematically illustrate chains of memory keys (MKEYs) for implementing cross-address-space bridging, in accordance with embodiments that are described herein.

FIG. 3 is a diagram that schematically illustrates a chain of MKEYs used for implementing cross-address-space bridging, in accordance with an embodiment that is described herein. As explained with respect to FIGS. 1 and 2 above, the MKEY chain for accessing a given memory sub-region 48 comprises the following:

A memory-domain MKEY 60 that translates the virtual address space of the PCIe domain 1 into respective physical addresses in the memory.

A cross-PCIe-domain MKEY 64 that points to memory-domain MKEY 60, and translates the virtual address space of PCIe domain 2 into the virtual address space of PCIe domain 1.

A cross-security-domain MKEY 68 that points to cross-PCIe-domain MKEY 64, and maps the VAs of memory sub-region 48. MKEY 68 is defined by policer 66 for the specific sub-region 48.

Figure 4:
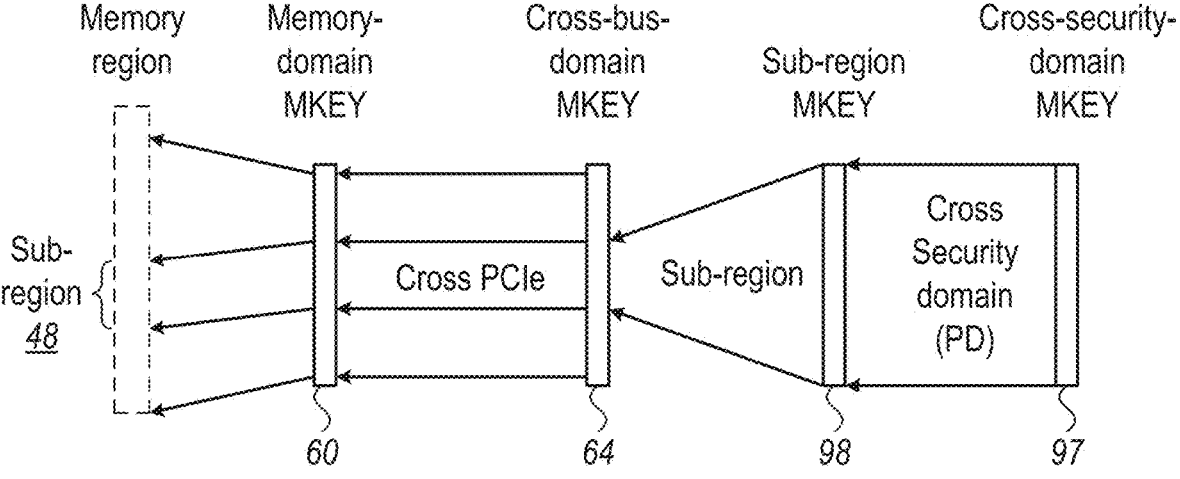

FIG. 4 is a diagram that schematically illustrates a chain of MKEYs used for implementing cross-address-space bridging, in accordance with an alternative embodiment that is described herein. In this embodiment, cross-security-domain MKEY 68 is replaced by a chain of two MKEYs—A cross-security-domain MKEY 97 and a sub-region MKEY 98. MKEY 97 performs the security functionality of MKEY 68 (i.e., modifies the Protection Domain (PD) of the sub-region). MKEY 98 performs the sub-region mapping functionality of MKEY 68 (i.e., maps the addresses of the sub-region).

The MKEY chains illustrated in FIGS. 3 and 4 are example chains that are depicted purely for the sake of conceptual clarity. In alternative embodiments, the disclosed cross-address-space bridging techniques can be carried out using other suitable chains of MKEYs of any suitable type. In the present context, the phrase "MKEY X points to MKEY Y" includes both schemes in which MKEY X points directly to MKEY Y, and schemes in which MKEY X points to MKEY Y via one or more intermediate MKEYs.

Example Method Description

Figure 5:
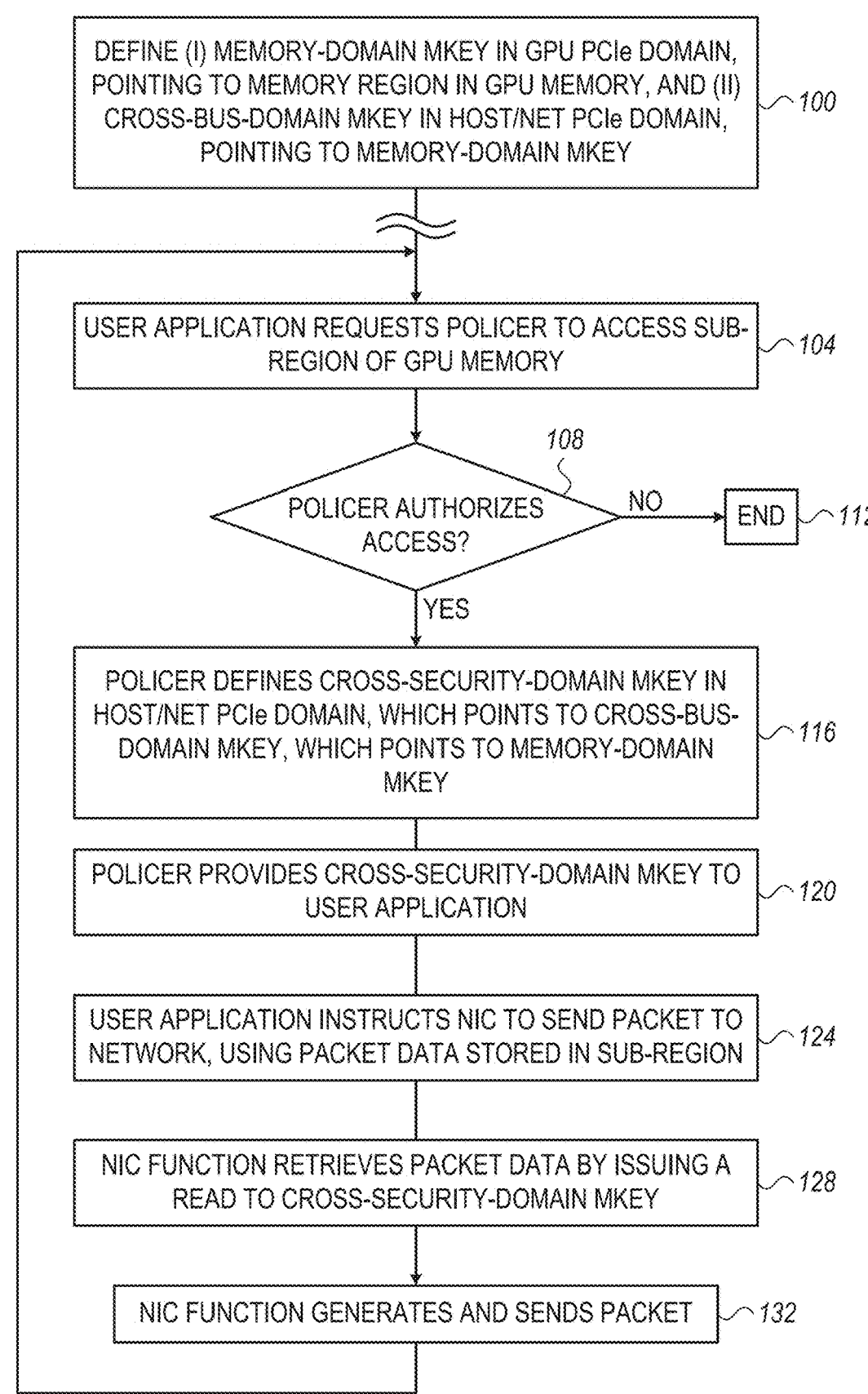
FIG. 5 is a flow chart that schematically illustrates a method for packet transmission using cross-address-space bridging, in accordance with an embodiment that is described herein.

FIG. 5 is a flow chart that schematically illustrates a method for packet transmission using cross-address-space bridging, in accordance with an embodiment that is described herein. The method refers to transmission of a packet using NIC 24 of FIG. 1, by way of example. Similar method flows can be used for packet transmission and reception using any suitable network device, e.g., DPU 74 of FIG. 2.

The method begins with an initialization stage 100, in which NIC 24 initializes memory-domain MKEY 60 and cross-PCIe-domain MKEY 64. At a certain point in time, a user application 40 instructs NIC 24 to send a packet to network 32, at an instruction stage 104.

At an access requesting stage 104, user application 40 requests policer 66 to access a certain sub-region 48 in memory 44 that stores the packet data.

At an authorization checking stage 108, policer 66 checks whether the access to the requested sub-region 48 complies with the applicable security policy. If not, the method terminates at a termination stage 112.

If the access is authorized, policer 66 defines a cross-security-domain MKEY 68 (or an equivalent pair of (i) cross-security-domain MKEY 97 and (ii) sub-region MKEY 98) for the sub-region 48, at an MKEY definition stage 116. The cross-security-domain MKEY 68 points to cross-PCIe-domain MKEY 64, which in turn points to memory-domain MKEY 60. At an MKEY providing stage 120, policer 66 provides the cross-security-domain MKEY 68 to user application 40.

At a transmission requesting stage 124, user application 40 requests NIC 24 to transmit the packet in question. At a packet data retrieval stage 128, NIC 24 retrieves the packet data from sub-region 48 using the chained MKEYs. This stage typically involves the following operations:

NIC function 52 accesses cross-PCIe-domain MKEY 64 using cross-security-domain MKEY 68 (or using cross-security-domain MKEY 97 and sub-region MKEY 98) defined for the sub-region.

NIC function 52 translates the VAs of the requested data buffer from the address space of PCIe domain 2 to the address space of PCIe domain 1 using cross-PCIe-domain MKEY 64.

DMA engine function 56 translates the VA of the requested data buffer (in the address space of PCIe domain 1) into the PA of the data buffer in memory 44, using memory-domain MKEY 60.

DMA engine function 56 retrieves the packet data from the resulting PA.

At a packet generation and transmission operation 132, NIC function 52 generates a packet comprising the packet data, and sends the packet to network 32.

Example System Use-Case

Figure 6:
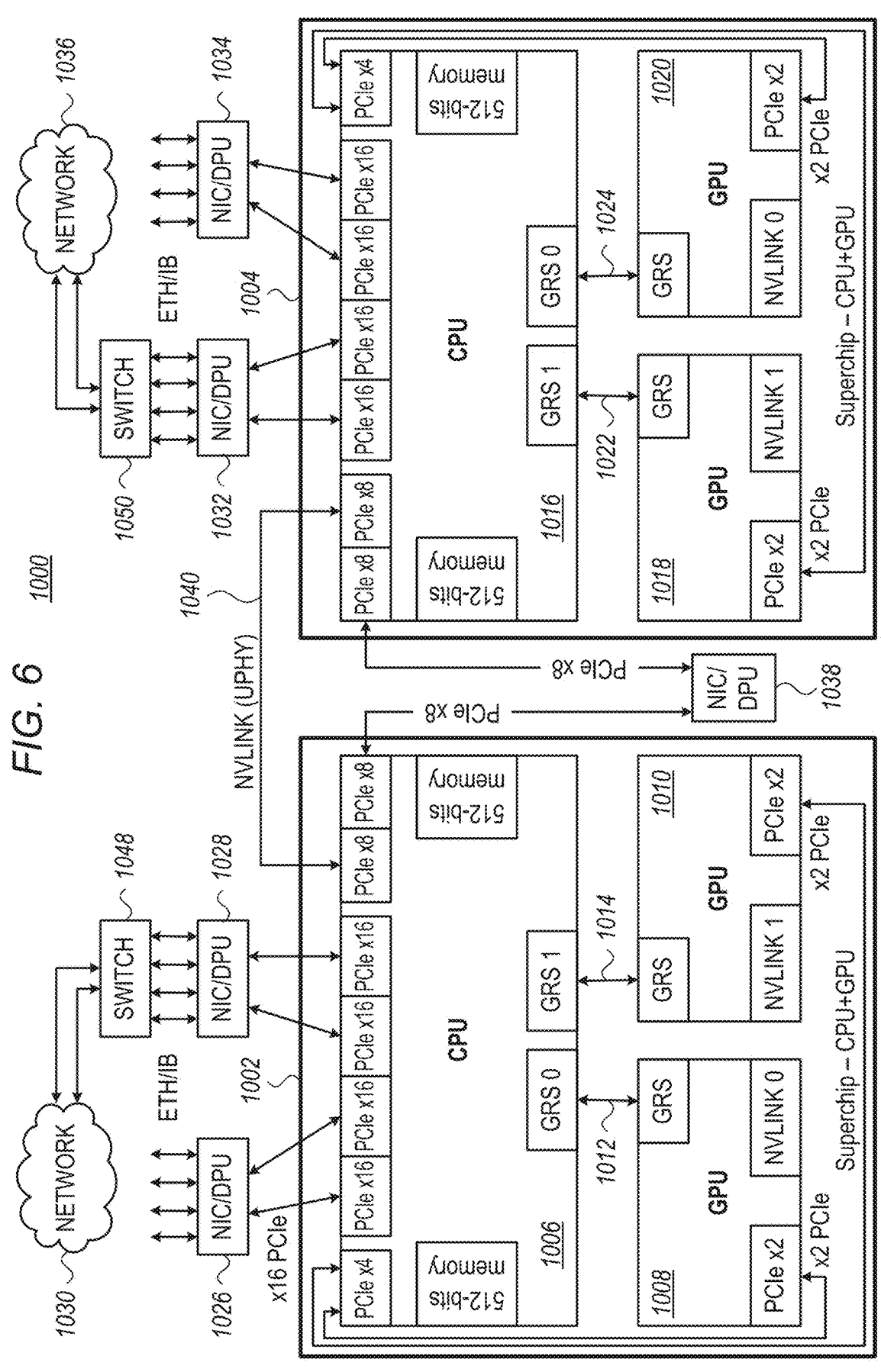
FIG. 6 is a block diagram that schematically illustrates a computing system comprising network devices that use small-overhead secured cross-address-space bridging, in accordance with an embodiment that is described herein.

FIG. 6 is a block diagram that schematically illustrates a computing system 1000, e.g., a data center or a High-Performance Computing (HPC) cluster, in accordance with an embodiment that is described herein. System 1000 comprises a plurality of subsystems, e.g. multiple processing devices coupled to each other, multiple network devices, and multiple networks, according to at least one embodiment. Computing system 1000 is designed with multiple integrated circuits (referred to as processing devices), where each integrated circuit can include one or more CPUs and GPUs, forming a powerful and flexible architecture.

The various processing devices are interconnected via an NVLink or other high-speed interconnect, enabling high-speed communication between the subsystems, and are also connected through a NIC or DPU to ensure efficient data transfer across computing system 1000 and to one or more external networks 1030, 1036. In the present example, system 1000 comprises a packet switch 1048 that connects NIC/DPU 1028 to network 1030, and a packet switch 1050 that connects NIC/DPU 1032 to network 1036.

The coupling of processing devices through NVLink allows for seamless data exchange and parallel processing, enhancing overall computational performance. The processing devices are connected to multiple networks through one or more network interface cards (NICs) or DPUs, enabling the system to handle complex, multi-network tasks with high bandwidth and low latency. This configuration is highly suitable for demanding applications that require significant processing power, such as artificial intelligence (AI), machine learning (ML), and data-intensive computing, while ensuring robust connectivity and scalability across various networked environments. The integrated circuits of the computing system 1000 can include one or more CPUs and one or more GPUs.

FIG. 6 also demonstrates an example architecture of a multi-GPU architecture. As illustrated in the figure, computing system 1000 includes a processing device 1002 with a multi-GPU architecture. In particular, processing device 1002 may be a system-on-chip and includes multiple subsystems such as a CPU 1006, a GPU 1008, and a GPU 1010. CPU 1006 can be coupled to GPU 1008 via a die-to-die (D2D) or chip-to-chip (C2C) interconnect 1012, such as a Ground-Referenced Signaling interconnect (GRS interconnect). CPU 1006 can be coupled to GPU 1010 via a D2D or C2C interconnect 1014. CPU 1006 can also couple to GPU 1008 and GPU 1010 via PCIe interconnects.

CPU 1006 can be coupled to one or more NICs or DPUs, which are coupled to one or more networks. For example, as illustrated in FIG. 6, CPU 1006 is coupled to a first NIC/DPU 1026, which is coupled to a network 1030. CPU 1006 is also coupled to a second NIC/DPU 1028, which is coupled to network 1030 via switch 1048. NIC/DPU 1026 and NIC/DPU 1028 can be coupled to network 1030 over Ethernet (ETH), NVLINK or InfiniBand (IB) connections, for example.

Computing system 1000 also includes a processing device 1004 with a multi-GPU architecture. In particular, processing device 1004 includes multiple subsystems including a CPU 1016, a GPU 1018, and a GPU 1020. CPU 1016 can be coupled to GPU 1018 via an D2D or C2C interconnect 1022. CPU 1016 can be coupled to GPU 1020 via a D2D or C2C interconnect 1024. CPU 1016 can also couple to GPU 1018 and GPU 1020 via PCIe interconnects. CPU 1016 can be coupled to one or more NICs or DPUs, which are coupled to one or more networks. For example, as illustrated in FIG. 6, CPU 1016 is coupled to a first NIC/DPU 1032, which is coupled to a network 1036. CPU 1016 is also coupled to a second NIC/DPU 1034, which is coupled to network 1036 via switch 1050. NIC/DPU 1032 and NIC/DPU 1034 can be coupled to network 1036 over Ethernet (ETH), NVLINK or InfiniBand (IB) connections.

In at least one embodiment, processing device 1002 and processing device 1004 can communication with each other via a NIC/DPU 1038, such as over PCIe interconnects. Processing device 1002 and processing device 1004 can also communicate with each other over a high-bandwidth communication interconnects 1040, such as an NVLink interconnect or other high-speed interconnects.

In various embodiments, any of the network devices of system 1000, e.g., any of NICs/DPUs 1026, 1028, 1032, 1034 and 1038, may use cross-address-space bridging in accordance with the techniques described herein. The packet switches in FIG. 6 may comprise, for example, Nvidia Quantum-2 switches. The NICs/DPUs in the figure may comprise, for example, Nvidia Bluefield DPUs.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network device, comprising:

one or more ports, to connect to a network;

a bus interface, to (i) communicate with a memory using a first bus domain of a peripheral bus, and (i) communicate with one or more user applications using a second bus domain of the peripheral bus; and one or more circuits, to:

execute a first bus function that accesses a region of the memory using a memory-domain memory key (MKEY) defined in the first bus domain;

execute a second bus function that communicates with the user applications using the second bus domain, and communicates packets over the network for the user applications, wherein processing of the packets includes accessing the region of the memory via a cross-bus-domain MKEY that points to the memory-domain MKEY in the first bus function; and in response to authorizing a user application to access a sub-region in the region of the memory, define for the sub-region a respective cross-security-domain MKEY that points to the cross-bus-domain MKEY, which in turn points to the memory-domain MKEY.

2. The network device according to claim 1, wherein, in response to authorizing one or more of the user applications to access one or more additional sub-regions in the region of the memory, the one or more circuits are to define one or more additional cross-security-domain MKEYs for the one or more additional sub-regions, the one or more additional cross-security-domain MKEYs pointing to the cross-bus-domain MKEY.

3. The network device according to claim 1, wherein the first bus function is to receive the cross-security-domain MKEY from a policer that authorizes requests from the user applications to access sub-regions in the region of the memory and defines respective cross-security-domain MKEYs for the sub-regions.

4. The network device according to claim 1, wherein, in response to a memory-access command from the user application that specifies a virtual address (VA), the one or more circuits are to translate the VA into a physical address (PA) in the sub-region, in accordance with an address mapping defined in the memory-domain MKEY, and to access the PA in the memory.

5. The network device according to claim 1, wherein the first bus function is to communicate with a Graphics Processing Unit (GPU), and the memory is internal to the GPU; and wherein the second bus function is to communicate with one or more hosts, and the user applications run on the one or more hosts.

6. The network device according to claim 1, wherein the network device is a Data Processing Unit (DPU) comprising a CPU and one or more processor cores;

wherein the first bus function is to communicate with the CPU, and the memory is internal to the CPU; and wherein the second bus function is to communicate with the one or more processor cores, and the user applications run on the one or more processor cores.

7. The network device according to claim 1, wherein the cross-security-domain MKEY comprises a first MKEY that modifies a Protection Domain (PD) of the sub-region, and a second MKEY that maps addresses of the sub-region.

8. A method in a network device, the method comprising:

communicating, by the network device, with a memory using a first bus domain of a peripheral bus, and with one or more user applications using a second bus domain of the peripheral bus;

executing in the network device a first bus function that accesses a region of the memory using a memory-domain memory key (MKEY) defined in the first bus domain;

executing in the network device a second bus function that communicates with the user applications using the second bus domain, and communicates packets over the network for the user applications, wherein processing of the packets includes accessing the region of the memory via a cross-bus-domain MKEY that points to the memory-domain MKEY in the first bus function; and in response to authorizing a user application to access a sub-region in the region of the memory, defining for the sub-region a respective cross-security-domain MKEY that points to the cross-bus-domain MKEY, which in turn points to the memory-domain MKEY.

9. The method according to claim 8, and comprising, in response to authorizing one or more of the user applications to access one or more additional sub-regions in the region of the memory, defining one or more additional cross-security-domain MKEYs for the one or more additional sub-regions, the one or more additional cross-security-domain MKEYs pointing to the cross-bus-domain MKEY.

10. The method according to claim 8, wherein executing the first bus function comprises receiving the cross-security-domain MKEY from a policer that authorizes requests from the user applications to access sub-regions in the region of the memory and defines respective cross-security-domain MKEYs for the sub-regions.

11. The method according to claim 8, and comprising, in response to a memory-access command from the user application that specifies a virtual address (VA), translating the VA into a physical address (PA) in the sub-region, in accordance with an address mapping defined in the memory-domain MKEY, and accessing the PA in the memory.

12. The method according to claim 8, wherein executing the first bus function comprises communicating with a Graphics Processing Unit (GPU);

wherein the memory is internal to the GPU;

wherein executing the second bus function comprises communicating with one or more hosts; and wherein the user applications run on the one or more hosts.

13. The method according to claim 8, wherein the network device is a Data Processing Unit (DPU) comprising a CPU and one or more processor cores;

wherein executing the first bus function comprises communicating with the CPU;

wherein the memory is internal to the CPU;

wherein executing the second bus function comprises communicating with the one or more processor cores; and wherein the user applications run on the one or more processor cores.

14. The method according to claim 8, wherein defining the cross-security-domain MKEY comprises defining a first MKEY that modifies a Protection Domain (PD) of the sub-region, and defining a second MKEY that maps addresses of the sub-region.

15. A data center, comprising one or more network devices, at least a network device among the network devices comprising:

one or more ports, to connect to a network;

a bus interface, to (i) communicate with a memory using a first bus domain of a peripheral bus, and (i) communicate with one or more user applications using a second bus domain of the peripheral bus; and one or more circuits, to:

execute a first bus function that accesses a region of the memory using a memory-domain memory key (MKEY) defined in the first bus domain;

execute a second bus function that communicates with the user applications using the second bus domain, and communicates packets over the network for the user applications, wherein processing of the packets includes accessing the region of the memory via a cross-bus-domain MKEY that points to the memory-domain MKEY in the first bus function; and in response to authorizing a user application to access a sub-region in the region of the memory, define for the sub-region a respective cross-security-domain MKEY that points to the cross-bus-domain MKEY, which in turn points to the memory-domain MKEY.

16. The data center according to claim 15, wherein, in response to authorizing one or more of the user applications to access one or more additional sub-regions in the region of the memory, the one or more circuits are to define one or more additional cross-security-domain MKEYs for the one or more additional sub-regions, the one or more additional cross-security-domain MKEYs pointing to the cross-bus-domain MKEY.

17. The data center according to claim 15, wherein the first bus function is to receive the cross-security-domain MKEY from a policer that authorizes requests from the user applications to access sub-regions in the region of the memory and defines respective cross-security-domain MKEYs for the sub-regions.

18. The data center according to claim 15, wherein, in response to a memory-access command from the user application that specifies a virtual address (VA), the one or more circuits are to translate the VA into a physical address (PA) in the sub-region, in accordance with an address mapping defined in the memory-domain MKEY, and to access the PA in the memory.

19. The data center according to claim 15, wherein the first bus function is to communicate with a Graphics Processing Unit (GPU), and the memory is internal to the GPU; and wherein the second bus function is to communicate with one or more hosts, and the user applications run on the one or more hosts.

20. The data center according to claim 15, wherein the network device is a Data Processing Unit (DPU) comprising a CPU and one or more processor cores;

wherein the first bus function is to communicate with the CPU, and the memory is internal to the CPU; and wherein the second bus function is to communicate with the one or more processor cores, and the user applications run on the one or more processor cores.

\* \* \* \* \*